(12) United States Patent
Skells

(10) Patent No.: US 7,013,333 B1
(45) Date of Patent: Mar. 14, 2006

(54) NETWORK MANAGEMENT SYSTEM

(75) Inventor: Michael James Dominic Skells, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/830,983

(22) PCT Filed: Dec. 1, 1999

(86) PCT No.: PCT/GB99/04012

§ 371 (c)(1),
(2), (4) Date: May 3, 2001

(87) PCT Pub. No.: WO00/33536

PCT Pub. Date: Jun. 8, 2000

(30) Foreign Application Priority Data

Dec. 3, 1998 (EP) .................................. 98309903

(51) Int. Cl.
*G06F 15/173* (2006.01)

(52) U.S. Cl. ..................... 709/223; 709/224; 709/226; 709/239; 709/240; 709/245; 370/245

(58) Field of Classification Search ................ 709/239, 709/240, 226, 245, 223, 224; 713/201; 370/389
See application file for complete search history.

(56) References Cited

U.S. PATENT DOCUMENTS

| | | | |
|---|---|---|---|
| 5,774,660 A | | 6/1998 | Brendel et al. |
| 6,058,431 A | * | 5/2000 | Srisuresh et al. ........... 709/245 |
| 6,243,379 B1 | * | 6/2001 | Veerina et al. .............. 370/389 |
| 6,321,336 B1 | * | 11/2001 | Applegate et al. .......... 713/201 |
| 6,735,631 B1 | * | 5/2004 | Oehrke et al. .............. 709/226 |

FOREIGN PATENT DOCUMENTS

| | | |
|---|---|---|
| EP | 0605339 A2 | 7/1994 |
| EP | 0865180 A2 | 9/1998 |

OTHER PUBLICATIONS

Srisuresh, Load Sharing Using IP Network Address Translation (LSNAT), Lucent Technologies, D.Gan, Juniper Networks, Inc. Aug. 1998.
EPO Search Report.
PCT International Preliminary Examination Report.
Dias et al, "A Scalable and Highly Available Web Server" Digest of Papers of Compcon (Computer Society Conference) 1996, Technologies for the Information Superhighway, Santa Clara, Feb. 25-28, 1996, No. Conf. 41, Feb. 25, 1996, pp. 85-92, XP000628467.

* cited by examiner

*Primary Examiner*—Ario Etienne
*Assistant Examiner*—Yves Dalencourt
(74) *Attorney, Agent, or Firm*—Nixon & Vanderhye P.C.

(57) ABSTRACT

A network management system has a network monitor arranged to monitor the load on elements of a computer network and to reconfigure the network when necessary to optimize its performance. The network configuration is carried out by servers in the network in response to an appropriate instruction from the network monitor. The servers operate to divert traffic from overloaded elements in the network by modifying both source and destination addresses of the transmitted data packets. In this manner the processing or database loads can be spread optimally among a plurality of servers in the network.

12 Claims, 5 Drawing Sheets

Figure 3

| Event | Client | Proxy | | Server |
|---|---|---|---|---|
| | | Client Side | Network Side | |
| 1 | Send connect from 1.2.3.4:3456 to 100.100.100.100:80 | | | |
| 2 | | Receive connect 1.2.3.4:3456 to 100.100.100.100:80 | | |
| 3 | | | Send connect 10.10.10.10:513 to 123.456.789:80 | |
| 4 | | | | Receive connect 10.10.10.10:513 to 123.456.789:80 Send Reply 123.456.789:80 to 10.10.10.10:513 |
| 5 | | | Receive reply 123.456.789:80 to 10.10.10.10:513 | |
| 6 | | Send reply 100.100.100.100:80 to 1.2.3.4:3456 | | |
| 7 | Receive reply 100.100.100.100:80 to 1.2.3.4:3456 | | | |

NETWORK MANAGEMENT SYSTEM

BACKGROUND OF THE INVENTION

1. Field of the Invention

The present invention relates to computer networks and to the management of traffic flow within such networks.

2. Related Art

The management and control of distributed computer networks providing information or processing to users present significant difficulties. As more diverse distributed systems are introduced into the network the network management and control tasks increase in complexity. This may be tackled by manual reconfiguration, upgrade or renewal of elements of the network. However, before the problem can be resolved, it is likely that users will have experienced a period of poor performance or other limitations on their activities.

These problems have been alleviated at least to some extent by the introduction of network management systems. These systems have a network monitor that is arranged to monitor the load on elements of the network and to redirect traffic to distribute the traffic in a more optimal manner. An example of such a system is disclosed in PCT patent application number WO 98/35302. In the disclosed system, the network monitor is arranged to monitor the load/performance of the network (or part of the network) and in addition maintains a model of the network that is optimised at regular intervals. If the performance of the model exceeds that of the actual network the system is arranged to change the configuration of the network so that it conforms to the model.

If, for example, the network being monitored is a distributed database, the system may be arranged to move data around the network to the points at which that data is in most demand. If the network is a set of mirror servers (i.e. a group of servers providing identical information or applications to a user) then the system may be arranged to divert traffic from overloaded servers to servers with spare processing capacity.

When traffic is diverted to an alternative destination, return traffic that results may, in some cases, give an indication of the diverted address. Some applications that access data or applications across a network are sensitive to such changes in address and detection of a change may result in an error state and cause the application to discontinue the communication.

BRIEF SUMMARY OF THE INVENTION

According to an embodiment of the present invention there is provided a method of routing data elements transmitted along a transmission path between an original source address and an original destination address, said data elements comprising an indication of source address and an indication of destination address, said method comprising the steps of:
  a) at a first point in the transmission path:
  i) receiving a first data element;
  ii) modifying the original source address to an alternative source address;
  iii) modifying the original destination address to an alternative destination address; and
  iv) re-transmitting the first data element on the transmission path; and
  b) at a second point in the transmission path corresponding to the alternative source address:
  i) receiving a second data element having the alternative source address as its destination address;
  ii) modifying the destination address to the original source address and modifying the source address to the original destination address; and
  iii) re-transmitting the second data element along the transmission path.

According to another embodiment of the invention there is provided an apparatus for routing data elements transmitted along a transmission path between an original source address and an original destination address, said data elements comprising an indication of source address and an indication of destination address, said apparatus comprising:
  a) first means arranged at a first point in the transmission path operable to:
  i) receive a first data element;
  ii) modify the original source address to an alternative source address;
  iii) modify the original destination address to an alternative destination address; and
  iv) re-transmit the first data element on the transmission path; and
  b) second means arranged at a second point in the transmission path having the alternative source address operable to:
  i) receive a second data element having the alternative source address as its destination address;
  ii) modify the destination address to the original source address and modify the source address to the original destination address; and
  iii) re-transmit the second data element along the transmission path.

These embodiments provide the advantage of insulating the originating application from any change in the identity of the source of data received.

BRIEF DESCRIPTION OF THE DRAWINGS

FIG. 3 shows an example of network addresses being processed in accordance with an embodiment of the invention;

DETAILED DESCRIPTION OF EXEMPLARY EMBODIMENTS

Where an organisation provides information on a global basis via Web pages it is common to have more than one database system, each providing the same information. These database systems are provided on computers (called servers) and are commonly referred to as mirror servers because the services they each provide appear identical to each other. Mirror servers are often at physically distant locations, for example a company may have one server in North America, one in Europe and another in Japan. Each mirror server may be intended to provide access to users via client computers located in the corresponding geographical region or for sharing a predominant load from one region with another region. The same considerations apply to application servers which can also be mirrored.

Figure 1:
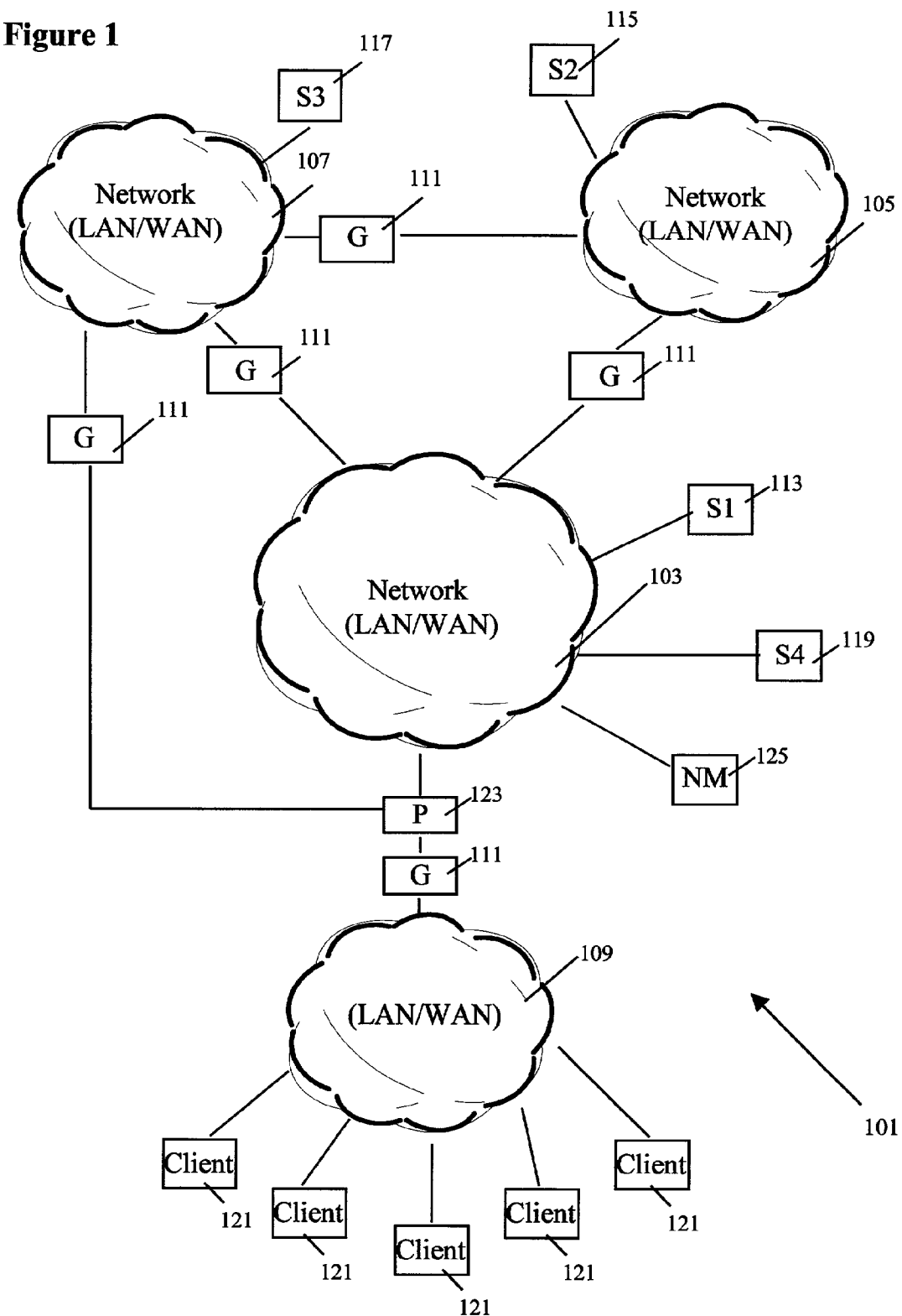
FIG. 1 is a schematic diagram showing a network of computer systems embodying the invention.

With reference to FIG. 1, a network of computer systems 101 comprises four individual networks 103, 105, 107, 109 that are interconnected. Each of the networks 103, 105, 107, 109 may for instance be a local area network (LAN) or a wide area network (WAN). One of the networks may be the Internet. Mirror servers 113, 115, 117, 119 are connected to the networks 103, 105, 107. Each mirror server is a conventional computer running an application program such as a database management system (DBMS) and each provides the same information to a user. The corresponding database may be stored in the memory of the computer or in a distributed manner. Network gateways 111 are provided at the connection point between each of the networks 103, 105, 107, 109. The network gateways are conventional computers which run application programs that carry out functions such as security checks and translation between different network protocols.

Client computers 121 are conventional computers running application programs that provide access to the servers 113, 115, 117, 119 via one or more of the networks 103, 105, 107, 109. Such applications may be in the form of a Web browser such as Netscape (trademark) or Internet Explorer (trademark) that enable a user to view data stored by the DBMS on one of the servers 113, 115, 117, 119. Data is commonly viewed in the form of Web pages that are stored in files by the DBMS. When a request is made from a client computer 121 to view a particular Web page, the server that receives the request transmits data representing the relevant page across the network to the client 121. The browser on the client 121 is arranged to then display the data, i.e. the Web page, to the user. In some cases data may be transmitted from the client 121 to a server.

Each of the computers in the network of computers 101 has assigned to it an identifying number called an Internet protocol address (IP address). Each address is unique and indicates where the computer is located in the network of computers 101. When data is transmitted across the network it is divided up into blocks of data which are then encapsulated in a transmission message commonly referred to as a packet. Each packet has the same basic structure which, as well as a portion of data also includes the IP address of the sending computer and the IP address of the receiving computer. The sending and receiving of packets is performed in accordance with a standardised communications (or transport) protocol such as TCP (Transport Control Protocol) by network communication software running on each of the computers in the network of computers 101. Each of the networks 103, 105, 107, 109 includes conventional functionality that is arranged to route each packet transmitted from a sending computer to the receiving computer identified in the packet by its IP address. Each IP address is also sub-divided by the transport protocol into a number of separate connections within the same computer called ports. Processes within a computer can be assigned to handle the communications that occur over a specific port or ports.

A network monitor 125 is connected to any one of the networks 103, 105, 107, 109 and arranged to monitor the processing load of each of the mirror servers 113, 115, 117, 119. An example of such a system is described in PCT application number WO 98/35302 which is arranged to monitor the performance of mirror servers and compare them against a dynamically updated model of the group of mirror servers. If at some point the performance of the model is deemed better than that of the actual system, the network monitor is arranged to output instructions to reconfigure the network to conform with the model. In this way the performance of the group of mirror servers can be optimised. For example, in the present embodiment one of the mirror servers 113 may be overloaded while another of the mirror servers 119 is working below capacity. In this case the network monitor 125 is arranged to output instructions that cause traffic from the overloaded mirror server 113 to be diverted to the under-loaded mirror server 119, thereby optimising the performance of the system as a whole.

In the present embodiment a proxy server 123 is provided at a point in the network 109 between the gateway 111 and the connections to the other networks 103, 107. The proxy server 123 is arranged to receive instructions over the network 103 from the network monitor 125 and to divert traffic emanating from the network 109 to the appropriate mirror server in accordance with the instructions received.

Figure 2A:
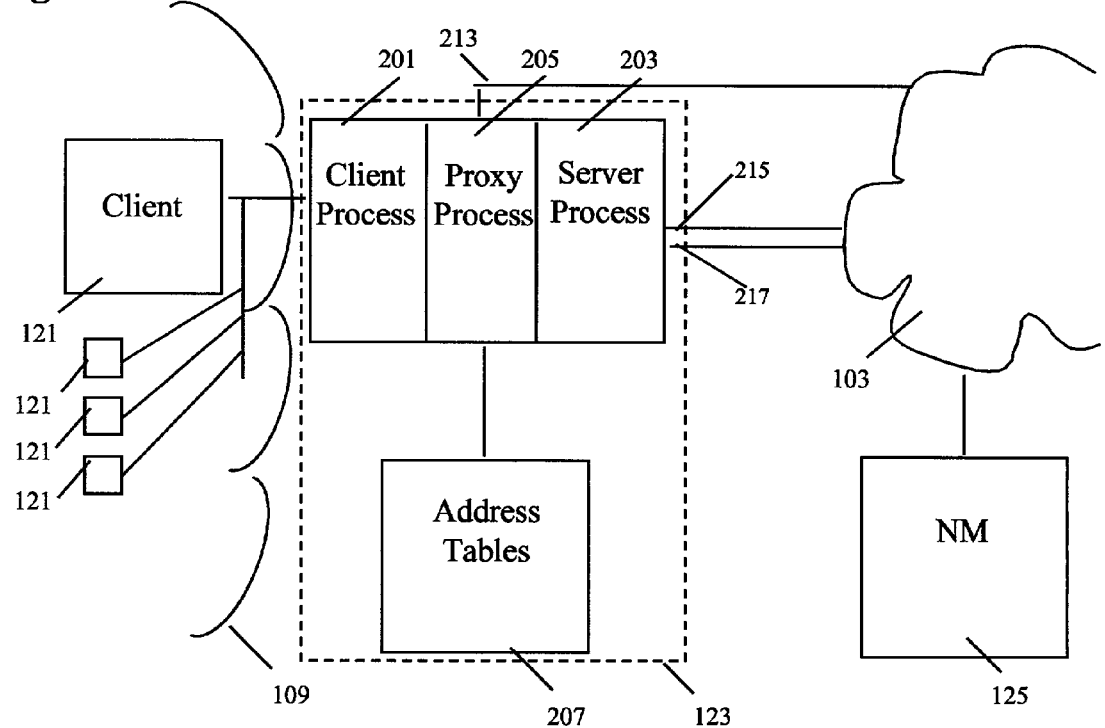
FIG. 2a shows a proxy server from FIG. 1 in more detail.
Figure 2B:
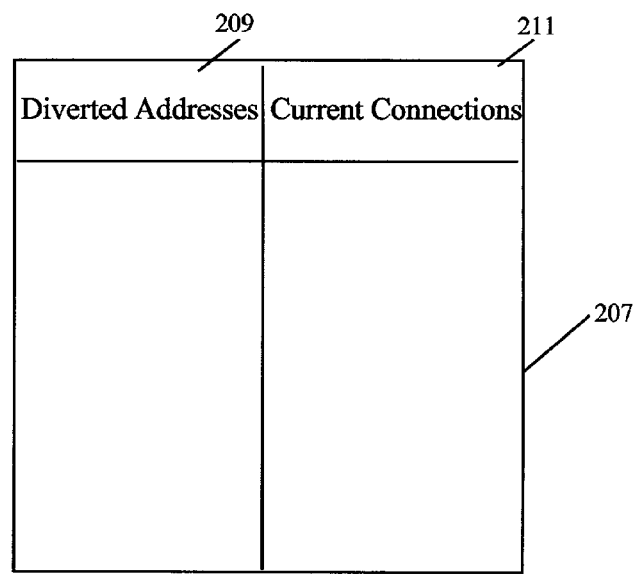
FIG. 2b shows part of the proxy server of FIG. 2 in further detail.

With reference to FIGS. 2a and 2b, the proxy server 123 carries out three main processes. A client process 201 handles the communications with the client computers 121 via the gateway 111 (not shown), a server process 203 handles communications via ports 215, 217 over the networks 103, 107 and a proxy process 205. The proxy process 205 takes packets received from the client process 201 and reads the source address and destination address of the packet. The proxy process 205 then checks the addresses against data stored in an address table 207. The address table 207 comprises a diverted addresses section 209 that is used for recording destination IP addresses that have been diverted to alternative IP addresses. The original destination address is stored along with the corresponding diverted address.

When the network monitor 125 determines that traffic from the network 109 should be diverted to an alternative one of the mirror servers 113, 115, 117, 119 it sends an instruction via the network 103 to the proxy server 123. The proxy process 205 is arranged to receive the instruction from the network monitor 125 via a port 213 that is different from the ports used by the client and server processes 201, 203. This enables the proxy process 205 to identify the incoming message as an instruction from the network monitor 125 to update the diverted addresses section 209 of the address table 207 in accordance with the received instruction. The instruction is in the form of a destination address and a corresponding diverted address. The proxy process 205 adds the new destination and corresponding diverted address from the instruction to the diverted address section 209. If an entry already exists for a particular destination address then the proxy process 205 updates the entry with the new diverted address from the instruction instead of creating a new entry.

FIG. 3 illustrates each event in the processing of IP addresses which occurs in the embodiment of the present invention when a packet is sent from a client 121 to a destination server 113 and diverted to an alternative server 119 by the proxy server 123.

In this example the client 121 has an IP address (including a port number of 3456) of 1.2.3.4:3456 and is to attempt to access a server identified as "service1.xyz.com" that has an actual IP address of 100.100.100.100:80. However, before access is initiated the network monitor 125 has sent an appropriate instruction to the proxy server 123 to divert all traffic from the network 109 that is destined for the site "service1.xyz.com" to a mirror server having an actual IP address of 123.456.789:80. As a result, the diverted addresses section 209 of the address table 207 now stores the destination/diverted address pair (100.100.100.100:80, 123.456.789:80).

With reference to FIG. 3, the client 121 sends the connection request and this gets routed to the gateway 111 towards the network 103. As shown in event 1 of FIG. 3, the packet carries the source address of the client 121 and the destination address of the server. As the packet passes from the gateway 111 towards the network 103 it is intercepted by the client process 201 of the proxy server 123 and passed to the proxy process 205 as shown in event 2 of FIG. 3. The proxy process 205 looks up the destination address in the diverted addresses area 209 of the address table 207. Locating a corresponding entry, the proxy process proceeds to translate the destination address in the packet from 100.100.100.100:80 to 123.456.789:80 using the appropriate entry in the address table 207 (i.e. 100.100.100.100:80, 123.456.789:80). The proxy process 205 then exchanges the source address of the packet from that of the client 121 to its own IP address i.e. 10.10.10.10, along with an indication of the output port number which in this case is 513 as shown in event 3 of FIG. 3.

Once both the source and destination addresses have been modified as noted above, the proxy process 205 stores a record of the client IP address, the destination address originally placed in the packet by the client 121, the source address of the packet as translated and the actual destination address as translated. This data is stored as pair of pairs of addresses in an area of the address table called the current connections 211. In the current example the following pair of pairs would be stored in the current connections 211:
(1.2.3.4:3456, 100.100.100.100:80),
 (10.10.10.10:513,123.456.789:80)

The packet is then passed to the server process 203 for transmission over the network 103 to the appropriate server 119. In response to the receipt of the packet the server 119 prepares return data in the form of another packet having the source address of the mirror server and the destination address of the proxy server 123 as shown in event 4 of FIG. 3. The packet is transmitted across the network 103 towards the network 109 and intercepted by the proxy server 123 as shown in event 5 of FIG. 3. The packet is then passed to the proxy process 205 which compares the source and destination addresses against the second pair of pairs in the current connections area 211 of the address table 207. On finding the matching entry (stored during event 3) the proxy process 205 exchanges the source and destination addresses for the first pair of pairs from the identified entry. This results in a packet having a source address which is the same as the destination address of the packet originating from the client 121 and having a destination address of the client 121, as shown in event 6 of FIG. 3. The packet is then passed to the client process 201 that transmits the packet over the network 109 to the client 121 as shown in event 7 of FIG. 3.

For the example above, the transmission of only one packet has been shown. However it will be understood that transmission protocols, e.g. TCP or UDP involve the transmission of large numbers of packets over the networks 103, 105, 107, 109 at any one time. In addition, the proxy server 123 is able to cope with communications between many client and server pairs substantially simultaneously, in a conventional manner. Accordingly it is possible that the address table 207 contains many entries in the diverted addresses section 209 and/or the current connections section 211.

Each entry in the current connections 211 governs the routing for the given TCP or UDP connection. Therefore, in the example above, until the end of the TCP connection, whenever the client process 201 receives a packet with a source/destination address (1.2.3.4:3456, 100.100.100.100: 80) it is re-sent by the server process 203 with a source/destination address of (10.10.10.10:513, 123.456.789:80). Similarly, when the server process 203 receives a packet with addresses of (123.456.789:80, 10.10.10.10:513) it is re-sent by the client process with the source/destination address (100.100.100.100:80, 1.2.3.4:3456).

In some cases it may be desirable to divert traffic from one destination to an alternative destination even during a network connection. In this case the network monitor 125 sends an appropriate instruction to the proxy process 205 to change the current destination address of the server to the diverted address. In response to the instruction, the proxy process 205 would update the appropriate entry in the diverted address section 209 and would also search the content of the current connections section 211 for a routing pair having the current destination address of the of the server having traffic diverted from it. Once this entry is located, the proxy process exchanges the current destination address in the entry for the diversion address. As a result, subsequent traffic will be diverted to the alternative server.

If the destination address is changed during a connection it is important to consider the protocols being used in the connection. It is important that the protocols above the transport layer protocols (TCP or UDP) are stateless or have state recovery i.e. they can be disconnected and higher level protocols are arranged to perform the re-connection. In other words they can be disconnected and then the higher level connection resumed at another destination without resulting in a breakdown in the data transmission. One example of a suitable protocol is Network File Server Protocol (NFS).

With reference to FIG. 3, it will be noted that the source/destination pair of the packet is the same in both events 1 and 7 and therefore the client computer 121 is not provided with any data that would suggest that any change in actual destination has occurred. This is the case for all the packets handled by the client 121 throughout a given network connection. In other words the interception of the packets by the proxy server 123 and their diversion to an alternative server is transparent to the client 121. Such transparency avoids problems that occur when an application program running on the client can only accept packets from a predetermined source and uses the source IP address in received packets to check this.

Such a problem may occur when the client 121 is running an application program written in the Java (trademark) programming language. Java programs run within a special software environment called a Java Virtual Machine (JVM) (trademark) that insulates the Java application from the normal operating environment of the client computer. Java is commonly used for providing functionality in Web pages and browsers. Java programs (referred to as Java applets) can be downloaded from a server and run on a client computer within a JVM provided as part of the functionality of a Web browser (commonly referred to as a "Java Enabled" browser).

One feature of Java enabled browsers is that once a Java applet has been downloaded, subsequent communications with the server are only allowed by the JVM if the IP address of the server remains constant. Therefore, if traffic from the client is diverted to a mirror server then communications subsequent to the diversion would be rejected by the JVM. This would mean that reallocating a mirror server during a connection would not be possible. However with the transparency described above, the JVM would be unaware of the diversion and continue communications normally.

As an optional feature, the current connections area 211 of the address table 207 can be used to store additional information about each connection. This may be performance information, for example network latency, throughput, packet sizes and volume, together with any network or transport failures. Once the information has been gathered under the control of the proxy process 205 it may be transmitted across the network 103 as input for the network monitor 125.

Figure 4:
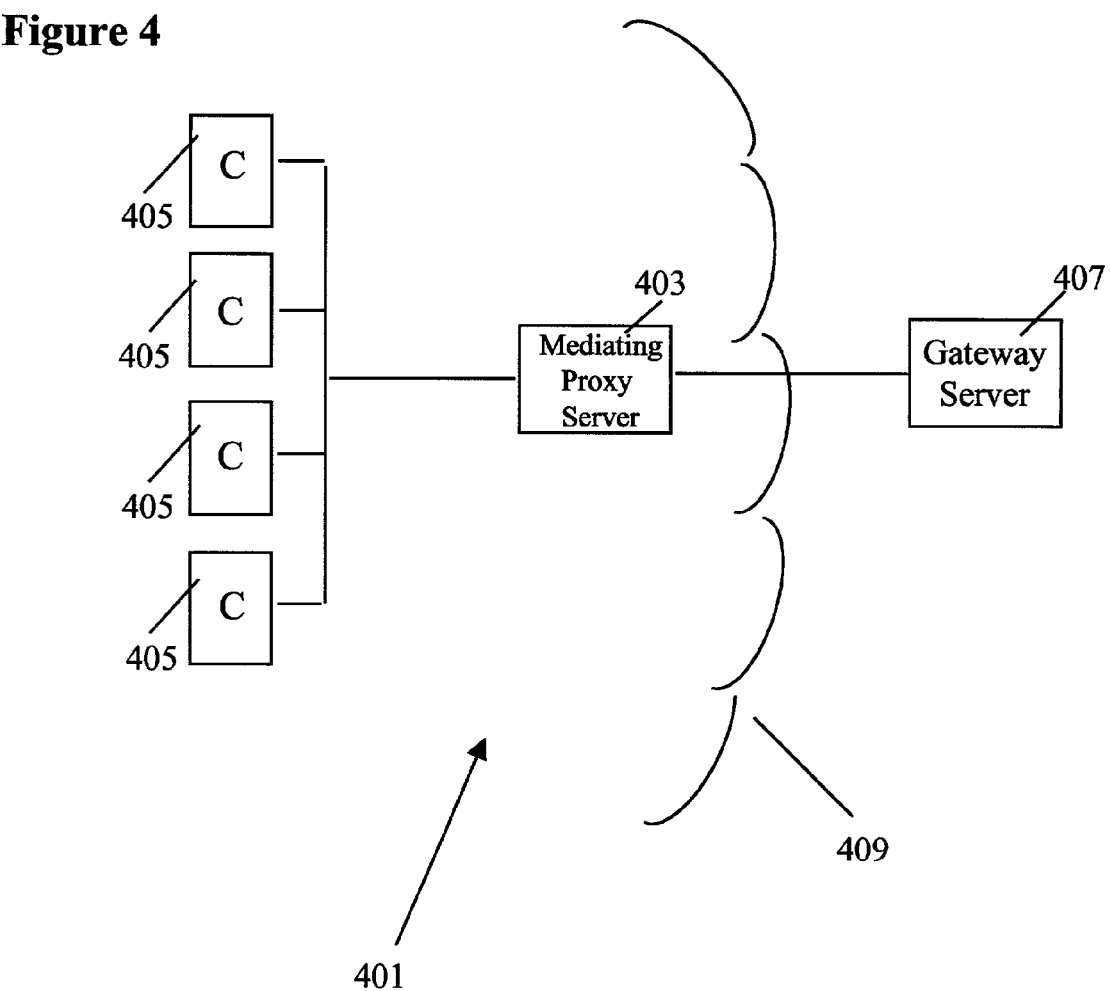
FIG. 4 is a schematic representation of a further embodiment of the invention.

With reference to FIG. 4, the invention may be embodied in a network of computers 401 that includes a mediating proxy server 403 that is connected between client computers 405 and a gateway server 407 of a network 409.

Mediating proxy servers are conventional and may also be referred to as adapters or bridges. These are conventional server arrangements running server application programs that are arranged to perform communications between different protocols and to appear to client computers as the same as a service that the client computer might access directly over the network. In addition to the normal function of a mediating proxy, the mediating proxy 403 is arranged to be able to divert traffic to alternative destinations and to do so in a transparent manner. This may be performed in response to instructions received from a network monitor (not shown in FIG. 4). The mediating proxy 403 is also capable of diverting traffic mid connection. These additional functions of the mediating proxy server 403 are performed by the same mechanisms as described above with reference to FIGS. 2a, 2b and 3 for the proxy server 123.

Figure 5:
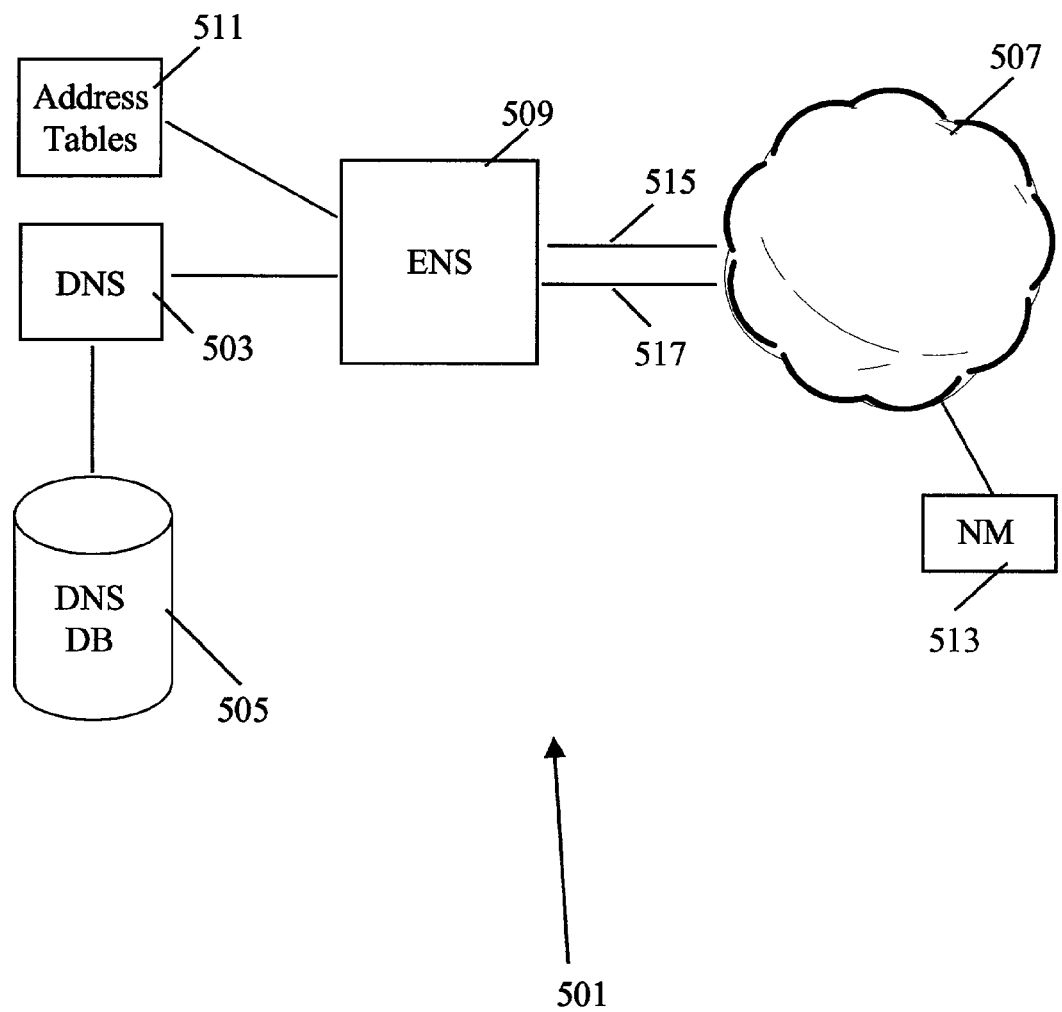
FIG. 5 is a schematic representation of another embodiment of the invention.

FIG. 5 illustrates another embodiment of the present invention in which instead of the invention being incorporated in a proxy server environment, it is embodied in a Domain Name Server (DNS) environment 501. Conventionally, a DNS server 503 translates between the Universal Resource Locators (URL) such as "www.bt.com" (that a user might enter into the command line of a Web browser on a client computer) and the actual IP address of the server on the network such as "109.9.34.346:80". The DNS 503 is connected to a database 505 holding URLs and their corresponding IP addresses. Computers (not shown) connected to the network 507 are arranged to make requests for IP addresses to the DNS by indicating a particular URL. In response to such a request, the DNS interrogates the database 505 and returns the IP address from the appropriate database entry to the requesting computer over the network 507.

In this embodiment however, an enhanced naming server (ENS) 509 is connected between the DNS and the network 507. The ENS is arranged to intercept a predetermined set of URLs while letting all other URLs proceed to the DNS (without changing any address information in the packets) to be processed in the conventional way as noted above. The predetermined set of URLs are stored in the address table 511. Once the ENS has identified a particular URL as one it should intercept it returns the corresponding IP address from the address table across the network 507 to the requesting computer.

The address table 511 used by the ENS 509 is updated over the network 507 by a network monitor 513. The network monitor 513 communicates with the ENS via a separate port 515 from the port or ports 517 used for normal DNS enquiries from computers over the network 507. The network monitor 513 operates in the same manner as the network monitor 125 described above and implements changes in network configuration and/or flow of network traffic by sending instructions the ENS 509. In response to these instructions the ENS 509 changes the IP address for a given URL stored in the address table 511. In this manner traffic from the area of the network served by the DNS 503 can be diverted from one server on the network 507 to another under the control of the network monitor 513.

Although in FIG. 5 the ENS 509 is shown connected directly to the DNS 503, it will be understood that the ENS 509 could be remote from the DNS 503 and have the capability to pass the normal (non intercepted) DNS requests over a network to the DNS 503.

It will be understood by those skilled in the art that the network monitor (in any one of the preceding embodiments) may include a system for routing the network traffic in accordance with local rules (such as the time of day), the source IP address, physical location of the client computer and load sharing information. As a further alternative, the network monitor could be a human operator. Also, the proxy server 123, the mediating proxy 403 and the ENS 509 could be split into a client to server portion and a server to client portion with each portion being provided separately.

Although the example above uses the DNS environment it will be understood that the teaching has applications in other systems where translation from name identifiers to addresses is performed. Furthermore the references to conventional computers or applications made in the description should not be read as excluding the utilisation of the invention using non-conventional computers. It will be understood that the principles described above are applicable to other systems in which services are supplied from one or more computers to one or more other computers and is not restricted to a client server environment.

The examples above have been described predominantly with reference to TCP/IP. However it will be understood that the teaching is applicable to other protocols such as ATM, DECNET (trademark) or SNA (trademark) for example.

What is claimed is:

1. A method of transparently re-routing data elements transmitted during a network connection along a transmission path between an original source address and an original destination address, said data elements comprising an indication of source address and an indication of destination address, said network connection having protocols above the transport layer protocol capable of maintaining data transmission during disconnection and reconnection when said data elements are re-routed, said method comprising:
    a) at a first point in the transmission path differing from said original destination address:
        i) receiving a first intercepted data element;
        ii) modifying the original source address to an alternative source address;
        iii) modifying the original destination address to an alternative destination address; and
        iv) re-transmitting the first data element on the transmission path; and
    b) at a second point in the transmission path corresponding to the alternative source address:
        i) receiving a second data element having the alternative source address as its destination address;
        ii) modifying the destination address to the original source address and modifying the source address to the original destination address; and
        iii) re-transmitting the second data element along the transmission path.

2. A method as in claim 1 in which the second data element is transmitted along the path from the alternative destination address in response to the receipt at the alternative destination of the first data element.

3. A method as in claim 1 in which the first point and the second point are at the same point in the transmission path.

4. A method as in claim 1 which further comprises storing the original source address, original destination address, alternative source address and the alternative destination address said stored addresses indicating an existing routing path for data elements having source and destination addresses matching the stored original source and destination addresses.

5. A method as in claim 4 which further comprises using said stored addresses to identify an existing routing path and modifying the alternative destination address of said identified routing path to a further alternative destination address.

6. An apparatus for transparently re-routing data elements transmitted during a network connection along a transmission path between an original source address and an original destination address, said data elements comprising an indication of source address and an indication of destination address, said network connection having protocols above the transport layer protocol capable of maintaining data transmission during disconnection and reconnection when said data elements are re-routed, said apparatus comprising:
 a) first means at a first point in the transmission path differing from said original destination address, said first means being configured to:
  i) receive a first intercepted data element;
  ii) modify the original source address to an alternative source address;
  iii) modify the original destination address to an alternative destination address; and
  iv) re-transmit the first data element on the transmission path; and
 b) second means at a second point in the transmission path having the alternative source address and being configured:
  i) receive a second data element having the alternative source address as its destination address:
  ii) modify the destination address to the original source address and modify the source address to the original destination address; and
  iii) re-transmit the second data element along the transmission path.

7. An apparatus as in claim 6 in which the second data element is transmitted along the path from the alternative destination address in response to the receipt at the alternative destination of the first data element.

8. An apparatus as in claim 6 in which the first point and the second point are at the same point in the transmission path.

9. An apparatus as in claim 6 further comprising means configured to store the original source address, original destination address, alternative source address and the alternative destination address said stored addresses indicating an existing routing path for data elements having source and destination addresses matching the stored original source and destination addresses.

10. An apparatus as in claim 9 further comprising means configured to use said stored addresses to identify an existing routing path and to modify the alternative destination address of said identified routing path to a further alternative destination address.

11. A computer program or suite of computer programs comprising instructions for causing one or more computers to carry out a method of transparently re-routing data elements transmitted during a network connection along a transmission path between an original source address and an original destination address, said data elements comprising an indication of source address and an indication of destination address, said network connection having protocols above the transport layer protocol which capable of maintaining data transmission during disconnection and reconnection when said data elements are re-routed, said method comprising:
 a) at a first point in the transmission path differing from said original destination address:
  i) receiving a first intercepted data element;
  ii) modifying the original source address to an alternative source address;
  iii) modifying the original destination address to an alternative destination address; and
  iv) re-transmitting the first data element on the transmission path; and
 b) at a second point in the transmission path corresponding to the alternative source address:
  i) receiving a second data element having the alternative source address as its destination address;
  ii) modifying the destination address to the original source address and modifying the source address to the original destination address; and
  iii) re-transmitting the second data element along the transmission path.

12. A computer program or suite of computer programs comprising instructions for causing one or more computers to provide apparatus for re-routing data elements transmitted during a network connection along a transmission path between an original source address and an original destination address, said data elements comprising an indication of source address and an indication of destination address, said network connection having protocols above the transport layer protocol which capable of maintaining data transmission during disconnection and reconnection when said data elements are re-routed, said one or more computers comprising:
 a) first means at a first point in the transmission path differing from said original destination address, said first means being configured to:
  i) receive a first intercepted data element;
  ii) modify the original source address to an alternative source address;
  iii) modify the original destination address to an alternative destination address; and
  iv) re-transmit the first data element on the transmission path; and
 b) second means at a second point in the transmission path having the alternative source address and being configured to:
  i) receive a second data element having the alternative source address as its destination address;
  ii) modify the destination address to the original source address and modify the source address to the original destination address; and
  iii) re-transmit the second data element along the transmission path.

* * * * *